United States Patent
Ebbesen et al.

(10) Patent No.: US 9,279,413 B2
(45) Date of Patent: Mar. 8, 2016

(54) WIND TURBINE

(71) Applicants: Henning Ebbesen, Skjern (DK); Bo Pedersen, Lemvig (DK); Kim Thomsen, Ikast (DK)

(72) Inventors: Henning Ebbesen, Skjern (DK); Bo Pedersen, Lemvig (DK); Kim Thomsen, Ikast (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 426 days.

(21) Appl. No.: 13/861,487

(22) Filed: Apr. 12, 2013

(65) Prior Publication Data

US 2013/0287574 A1   Oct. 31, 2013

(30) Foreign Application Priority Data

Apr. 26, 2012 (EP) .................................. 12165721

(51) Int. Cl.
| | |
|---|---|
| F03D 9/00 | (2006.01) |
| F03D 11/00 | (2006.01) |
| F03D 11/02 | (2006.01) |
| F03D 7/02 | (2006.01) |
| F04D 29/00 | (2006.01) |
| F04D 29/34 | (2006.01) |
| F03B 13/00 | (2006.01) |
| F16C 43/04 | (2006.01) |

(52) U.S. Cl.
CPC ............ *F03D 11/00* (2013.01); *F03D 11/0008* (2013.01); *F03D 11/028* (2013.01); *F05B 2240/50* (2013.01); *Y02E 10/722* (2013.01); *Y02E 10/726* (2013.01)

(58) Field of Classification Search
CPC . F03D 11/002; F03D 11/0008; F03D 1/0691; F03D 11/00; F16C 11/00; F16C 35/067; F16C 2360/31; F16C 2300/14; F16C 2226/60; F05B 2250/31; F05B 2230/21; F05B 2220/7066; Y02E 10/721; Y02E 10/722; Y02E 10/726; Y10T 29/49679; Y10T 29/49826; F02B 2240/50
USPC ........ 416/170 R, 174, 204 R, 244 R; 415/4.1, 415/4.3, 124.2; 290/54–55; 384/571, 559, 384/585
See application file for complete search history.

(56) References Cited

U.S. PATENT DOCUMENTS

| | | | | |
|---|---|---|---|---|
| 4,083,613 | A * | 4/1978 | McGee .......................... | 384/585 |
| 4,757,211 | A | 7/1988 | Kristensen | |
| 6,866,423 | B2 * | 3/2005 | Faltus et al. .................... | 384/559 |
| 6,879,055 | B2 * | 4/2005 | Becker et al. .................... | 290/55 |
| 6,911,741 | B2 * | 6/2005 | Pettersen et al. ................ | 290/55 |
| 6,921,243 | B2 * | 7/2005 | Canini et al. .................... | 290/55 |
| 7,084,522 | B2 * | 8/2006 | Wobben .......................... | 290/55 |

(Continued)

FOREIGN PATENT DOCUMENTS

| | | | | |
|---|---|---|---|---|
| DE | 4402184 | A1 * | 8/1995 | ............... F03D 9/00 |
| DE | 10255745 | A1 * | 6/2004 | ............... F03D 9/00 |

(Continued)

*Primary Examiner* — Thai Ba Trieu (57) ABSTRACT

A wind turbine is provided. The wind turbine includes a stationary main shaft arranged within a nacelle of the wind turbine, a rotor hub including a hollow shell defining an interior and a plurality of rotor blades extending radially outwards from the rotor hub, wherein the rotor hub is rotatably mounted to the stationary main shaft via at least one bearing, wherein the at least one bearing is arranged within the interior of the rotor hub and connected to a section of the main shaft protruding into the interior of the rotor hub.

14 Claims, 7 Drawing Sheets

(56) References Cited

U.S. PATENT DOCUMENTS

| | | | |
|---|---|---|---|
| 7,154,192 B2* | 12/2006 | Jansen et al. | 290/55 |
| 7,205,678 B2* | 4/2007 | Casazza et al. | 290/55 |
| 7,360,310 B2* | 4/2008 | Bagepalli et al. | 290/55 |
| 7,528,497 B2* | 5/2009 | Bertolotti | F03D 11/04 290/55 |
| 7,547,985 B2* | 6/2009 | Takaichi et al. | 290/55 |
| 7,550,863 B2* | 6/2009 | Versteegh | 290/55 |
| 7,600,964 B2* | 10/2009 | Rogall et al. | 415/4.5 |
| 8,052,396 B2* | 11/2011 | Wobben | 416/244 R |
| 8,120,198 B2* | 2/2012 | Pabst et al. | 290/55 |
| 8,147,183 B2* | 4/2012 | Madge et al. | 415/124.1 |
| 8,264,097 B2* | 9/2012 | Numajiri | 290/55 |
| 8,500,400 B2* | 8/2013 | Signore et al. | 416/1 |
| 8,556,591 B2* | 10/2013 | Koronkiewicz | 416/244 R |
| 8,662,850 B2* | 3/2014 | Castell Martinez et al. | 416/204 R |
| 8,710,693 B2* | 4/2014 | Amano et al. | 290/55 |
| 8,911,211 B2* | 12/2014 | Castell Martinez et al. | 416/204 R |
| 8,912,680 B2* | 12/2014 | Gelmini et al. | 290/55 |
| 8,994,205 B2* | 3/2015 | Castell Martinez | F03D 11/028 290/55 |
| 2003/0086631 A1* | 5/2003 | Faltus et al. | 384/559 |
| 2005/0232528 A1* | 10/2005 | Gobel et al. | 384/571 |
| 2006/0104815 A1* | 5/2006 | Siegfriedsen | 416/170 R |
| 2007/0186692 A1* | 8/2007 | Waszak | F03D 7/0272 73/862.331 |
| 2007/0222226 A1* | 9/2007 | Casazza et al. | 290/55 |
| 2008/0012346 A1* | 1/2008 | Bertolotti | F03D 11/04 290/55 |
| 2008/0205812 A1* | 8/2008 | Landwehr | 384/549 |
| 2008/0219606 A1* | 9/2008 | Sada et al. | 384/286 |
| 2008/0279686 A1* | 11/2008 | Demtroder | 416/61 |
| 2009/0015020 A1* | 1/2009 | Stiesdal | 290/55 |
| 2009/0309369 A1* | 12/2009 | Llorente Gonzalez | 290/55 |
| 2010/0019502 A1* | 1/2010 | Pabst et al. | 290/55 |
| 2010/0253087 A1* | 10/2010 | Lauke | 290/55 |
| 2010/0264664 A1* | 10/2010 | Lauke | 290/55 |
| 2010/0296763 A1 | 11/2010 | Loeschner | |
| 2010/0308594 A1* | 12/2010 | Numajiri | 290/55 |
| 2011/0027086 A1* | 2/2011 | Zeidlhack | 416/174 |
| 2011/0109099 A1* | 5/2011 | Stiesdal | 290/55 |
| 2011/0250077 A1* | 10/2011 | Pedersen | 416/244 R |
| 2011/0309632 A1* | 12/2011 | Rebsdorf | 290/55 |
| 2012/0315129 A1* | 12/2012 | Castell Martinez et al. | 415/122.1 |
| 2013/0017089 A1* | 1/2013 | Stiesdal | 416/174 |
| 2013/0049372 A1* | 2/2013 | Lagerweij et al. | 290/55 |
| 2013/0071246 A1* | 3/2013 | Kari et al. | 416/174 |
| 2013/0302175 A1* | 11/2013 | Munk-Hansen | F03D 11/00 416/245 R |
| 2014/0064963 A1* | 3/2014 | Tobinaga | 416/1 |
| 2014/0219804 A1* | 8/2014 | Bitsch et al. | 416/215 |
| 2014/0314580 A1* | 10/2014 | Lind et al. | 416/244 R |
| 2015/0016998 A1* | 1/2015 | Pasquet et al. | 416/147 |
| 2015/0017000 A1* | 1/2015 | Sato et al. | 384/283 |
| 2015/0030277 A1* | 1/2015 | Pick et al. | 384/558 |
| 2015/0125104 A1* | 5/2015 | Kullin et al. | 384/558 |
| 2015/0139809 A1* | 5/2015 | Schroppel | 384/456 |
| 2015/0159631 A1* | 6/2015 | Bitsch | F03D 11/0008 |

FOREIGN PATENT DOCUMENTS

| | | | |
|---|---|---|---|
| DE | 102004030929 B3 | 10/2005 | |
| DE | 102012221255 A1 * | 5/2014 | F03D 11/04 |
| EP | 1302683 A2 * | 4/2003 | F16C 33/60 |
| EP | 1394406 A2 * | 3/2004 | F03D 9/00 |
| EP | 1641102 A1 * | 3/2006 | F03D 9/00 |
| WO | WO 2011071378 A2 | 6/2011 | |
| WO | WO 2011076795 A2 | 6/2011 | |

* cited by examiner

WIND TURBINE

CROSS REFERENCE TO RELATED APPLICATIONS

This application claims priority of European Patent Office application No. 12165721.7 EP filed Apr. 26, 2012. All of the applications are incorporated by reference herein in their entirety.

FIELD OF INVENTION

The invention relates to a wind turbine with a stationary main shaft arranged within a nacelle of the wind turbine, a rotor hub comprising a hollow shell defining an interior and a plurality of rotor blades extending radially outwards from the rotor hub, wherein the rotor hub is rotatably mounted to the stationary main shaft via at least one bearing.

BACKGROUND OF INVENTION

Wind turbines typically comprise a nacelle arranged on top of a tower of the wind turbine. A main shaft is stationary arranged within the nacelle that rotatably mounts a rotor hub with a plurality of rotor blades via a main bearing. The main bearing may be arranged as a tapered bearing capable of supporting axial and radial loads. Typically, the main bearing is arranged between an end of the main shaft facing the rotor hub and mounting means arranged on an outer surface of the rotor hub, in particular flanges.

Arrangements for rotatably mounting the rotor hub to the main shaft utilising more than one bearing are also known. WO 2011/071378 A2 describes a wind turbine with a rotor hub firmly connected to a tube member that has two tapered roller bearings for rotatably mounting the rotor hub to the main shaft. The two tapered roller bearings are located relatively close to each other, so that both bearings carry a part of the total weight of rotating parts of the wind turbine.

WO 2011/076795 A2 describes a rotor hub for a wind turbine that is made from two or more moulded hub parts that form, when assembled, a hollow shell. Each hub part comprises at least a section of the blade bearing flange adapted to be connected to one of the rotor blades of the wind turbines. Furthermore, each hub part comprises at least a connecting portion that is either adapted to be connected to a corresponding connecting portion of another hub part or to be attached to a stiffening element that provides the hub part with additional stability. In the latter case, the stiffening element extends radial inwards into an interior defined by the hollow shell when assembled. The rotor hub is rotably mounted to the main shaft via a bearing that is attached to a main shaft flange arranged on an outer surface of the hollow shell.

Wind turbines may be directly or indirectly driven. Directly driven wind turbines transfer the torque generated by wind passing over the rotor blades directly to a rotor of a generator that is rotatably arranged with respect to a stator of a wind turbine. Electric power is generated by magnetic induction. Generators capable of converting mechanical energy into electrical power are well established in the state of art. Indirectly driven wind turbines comprise a gear box or a transmission arranged between the rotating rotor hub and the rotor of the generator allowing for an adjustment of the angular velocity of the rotor with respect to the stator.

With the recent development of constructing larger wind turbines capable of generating electrical power of more than 6 MW, rotor hubs and rotor blades have significantly increased in size. Consequently, the bearing rotatably mounting the rotor hub has to support bigger loads. Even today, the bearing is a major cost driver when constructing wind turbines.

SUMMARY OF INVENTION

It is thus an object of the present invention to provide a wind turbine, in particular a directly driven wind turbine, with an improved arrangement of the at least one bearing with respect to the rotor hub and the main shaft so that, in particular, the load on the at least one bearing is reduced.

According to the invention, the object is achieved by a wind turbine of the afore-mentioned type, wherein the at least one bearing is arranged within the interior of the rotor hub and connected to a section of the main shaft protruding into the interior of the rotor hub.

The key idea of the present invention is to place the at least one bearing substantially supporting the weight of rotating parts of the wind turbine as close to the centre of mass of the rotating parts as possible. This reduces static and dynamic bending moments exerted on the at least one bearing, so that, in particular, load of the at least one bearing is reduced. As an additional advantage, requirements on the bearing relating to the capability of supporting axial loads are reduced. This allows for a use of alternative bearings that are in expensive to produce or for a construction of larger wind turbines capable of generating an increased output of electrical power even with the bearings that are readily available.

In the context of the specification, the rotating parts of the wind turbine are defined as the rotor hub and all parts firmly attached to the rotor hub. Thus, in the case of a directly-driven wind turbine, the rotating parts include the rotor hub, the rotor blades, a rotor firmly connected to the rotor hub and a spinner cover covering the rotor hub. In the case of a indirectly-driven wind turbine, the rotor of the generator is connected to the rotor hub via an intermediate gear box or transmission. Thus, in the latter case, the rotor is not considered as a rotating part in the meaning of this definition.

The at least one bearing has an angular structure defining a vertical plane that is arranged perpendicularly to an axis of rotation substantially defined by the main shaft of the wind turbine. Typically, the centre of a mass of rotating components is located within the rotor hub and on the axis of rotation. Arrangement of the at least one bearing within the rotor hub thus ensures that the vertical plane defined by the bearing is located in proximity of the centre of mass of the rotating parts so that shear forces acting on the at least one bearing during operation of the wind turbine are reduced.

The distance of the vertical plane defined by the at least one bearing from the centre of mass in an axial direction parallel to the axis of rotation is preferably less than one meter, most preferably less than 0.5 meters. However, it is understood that specific values for the distance of the centre of mass with respect to the vertical plane defined by the at least one bearing depend on the size of the actual wind turbine. Larger wind turbines having large rotor hubs with heavy rotor blades attached thereto may require the at least one bearing supporting the weight of the rotating parts even closer to the centre of mass.

According to one embodiment of the invention, an outer ring of the at least one bearing is firmly connected to an annular member of the rotor hub protruding inwards into the interior of the rotor hub. The outer ring is rotatably arranged relative to an inner ring of the at least one bearing. The inner ring is firmly connected to the section of the main shaft protruding into the interior of the rotor hub. In an alternative embodiment, the outer ring is integral with the annular member protruding inwards into the interior of the rotor hub. The annular member provides sufficient stability so that the rotor hub is securely mounted to the main shaft.

The outer ring may have a circular shape or, in the case when the at least one bearing is arranged as a hydrodynamic or journal bearing, an elliptical cross-section. In the latter case, the clearance is decreased in one direction and increased in another direction perpendicular thereto. Alternatively, the outer ring may have grooves or the like that allow for, similar to the arrangement of the outer ring with the elliptical shape, deposition of lubricants, in particular oil.

It is preferred that the at least one bearing is arranged within the rotor hub close to the centre of mass so that a static bending exerted on the bearing by the weight of the rotating parts is less than 1.500 KNm, even more preferably less than 1.000 KNm, most preferably less than 500 KNm.

It is suggested to configure the at least one bearing as an radial and/or thrust bearing capable of supporting axial and/or radial loads. In some embodiments of the invention, the rotor hub is rotatably supported by more than one bearing that may exhibit different types of construction. Arrangement of the at least one bearing close to the centre of mass of the rotating parts relieves requirements relating to the type of bearing suitable for use in wind turbines. In particular, journal bearings haven't been considered appropriate for supporting large and heavy rotor hubs in conjunction with the recent development of constructing bigger wind turbines, in particular wind turbines that are capable of generating an output of more than 10 MW, prior this invention. Journal bearing are generally inexpensive to manufacture and may be considered for mounting the rotor hub to the main shaft when arranging the bearing close to the centre of mass, as load and bending moments are reduced.

Preferably, the wind turbine is directly driven. The rotor of the generator of the wind turbine is firmly attached to the rotor hub so that the rotor jointly rotates with the rotor hub during operation of the wind turbine. The stator of the generator is attached to the main shaft. The stator is arranged adjacent to the rotor comprising an arrangement of permanent magnets, so that an electric current is generated by means of induction when the wind turbine is in use. Directly driven wind turbines feature an increased robustness which results in a reduced demand for maintenance. As a consequence, directly driven wind turbines may preferably be used in remote locations such as offshore wind parks.

According to various embodiments of the invention, the at least one bearing is a ball bearing, roller bearing, tapered roller bearing, sliding bearing, journal bearing, hydrodynamic bearing, hydrostatic bearing or hybrid bearing. A hybrid bearing is a combination of a hydrostatic and a hydrodynamic bearing. Hydrostatic bearings are usually pressurised by an external pump, whereas fluid pressure in hydrodynamic bearings is provided by dynamical effects during operation. In embodiments using more than one bearing for mounting the rotor hub to the main shaft, different types of bearings may be used. In particular one of the bearings may be arranged as a roller bearing and a second bearing may be arranged as a sliding bearing. Moreover, in the case when multiple bearings for mounting the rotor hub are provided, the different bearings may be configured for supporting loads in different directions. In particular, one of the bearings may be configured as an axial bearing and another of the bearings may be configured as a radial bearing. However, the scope of the present invention is not limited to these aforementioned examples and different combinations of bearings may be utilised so that the axial and the radial load exerted on the bearings by the rotating parts is sufficiently accounted for.

The wind turbine is preferably configured in a manner that the centre of mass of the rotating parts, which include the rotor hub and the parts of the wind turbine that are firmly attached to the rotor hub, is located in the vertical plane defined by the at least one bearing mounting the rotor hub to the main shaft. The vertical plane extends perpendicular to the axis of rotation defined by the main shaft. It is understood that manufacture tolerances have to be appropriately accounted for when determining the location of the centre of mass of the rotating parts and/or the extension of the vertical plane defined by the at least one bearing. Thus, even in the embodiment in which the centre of mass of the rotating part is located in the vertical plane, a tolerance 5 to 45 cm or more, depending on the size of the wind turbine, has to be considered. Arrangement of the at least one bearing substantially around the centre of mass of the rotating parts minimises friction and load so that the wind turbine may operate with high efficiency for prolonged periods without maintenance.

According to preferred embodiments of the invention, the rotor hub is rotatably mounted to the main shaft via at least two bearings, wherein at least one of the bearings is located in the interior of the rotor hub close to the centre of mass of rotating parts. This allows for a distribution of the load among several bearings. The individual bearings may be adapted to support a load in one or more directions. According to a preferred embodiment, the bearing located closer to the centre of mass of the rotating parts is arranged as a double tapered rolling bearing. A second bearing is located further away from the centre of mass and is configured as a radial ball bearings. However, other combinations of bearings may be provided, in particular including radial, axial and/or thrust bearings configured as sliding bearings, journal bearings, ball bearing, roller bearings and the like.

Accordingly, it is suggested to arrange the at least two bearings within the interior of the rotor hub. According to a preferred embodiment, the at least two bearings are located in the interior of the rotor hub, wherein each bearing defines a vertical plane perpendicular to the axis of rotation. The bearings are arranged so that the centre of mass of the rotating parts is located between the vertical planes defined by the bearings.

The bearings located inside the rotor hub may be configured to support different kinds of load. In particular, one of the bearings may be arranged as a pure radial bearing and the other of the bearings may be arranged as a pure thrust bearing capable of supporting loads only in the axial direction. However, other combinations of bearings described herein before may be used.

In embodiments using more than one bearing for mounting the rotor hub to the main shaft, it is preferred that at least one of the bearings is configured to support at least an axial load and another of the at least two bearings is configured to support at least a radial load. However, each of the at least two bearings may also be configured to support both an axial and a radial load, such as a tapered bearing, in particular a tapered roller or a journal bearing.

The invention further relates to a rotor hub for a wind turbine as described hereinbefore. The rotor hub is adapted to be connected to a plurality of rotor blades, in particular via mounting means arranged as blade bearing flanges. The rotor hub comprises a hollow shell that defines an interior. At least one annular member that is connectable to a bearing adapted to rotatably mount the rotor hub to the stationary main shaft of the wind turbine protrudes inwards into the interior of the rotor hub so that the bearing may be arranged close to the centre of mass of rotating parts when the wind turbine is assembled.

In an alternative embodiment, the annular member is an integral part of the bearing itself, in particular an outer ring of the bearing that is rotatably arranged relative to an inner ring of the bearing. As defined herein before, the rotating parts of the wind turbine comprise all parts firmly connected to the rotor hub and the rotor hub itself.

In one embodiment of the invention, the at least one annular member extends radial inwards from an inner surface of the shell. The annular member is thus substantially arranged as a ring. Preferably, the annular member is located within the interior at a position so as to be circumferentially arranged around the centre of mass of the rotating parts when the wind turbine is assembled. The annular member provides a structure of sufficient stability so that the bearing may be securely attached to the annular member.

In particular in embodiments comprising a single bearing for mounting a rotor hub to the main shaft, the annular member may be arranged with the outer ring of the bearing as one piece.

In an alternative embodiment of the invention, the at least one annular member extends axially inwards into the interior from a side of the shell configured to face, when the wind turbine is assembled, the main shaft of the wind turbine. When the wind turbine is assembled, the bearing is attached to the annular member and thus located within the interior of the rotor hub close to the centre of mass of the rotating parts. Consequently, bending forces exerted on the bearing are minimised when the wind turbine is in operation.

The annular member is preferably an annular flange integral with the shell of the rotor hub. In particular the annular flange integral with the shell may be manufactured by means of casting. In an alternative embodiment, the shell of the rotor hub is assembled from several hub parts, wherein the annular flange is formed from flange sections integral with the hub parts.

In yet another alternative embodiment, the hollow shell is assembled from at least two hub parts, wherein each hub part comprises at least a section of the blade bearing flange adapted to be connected to one of the rotor blades and at least a connecting portion adapted to be connected to the annular member. When the rotor hub is assembled, the connecting portions of the hub parts connect to the annular member. In one preferred embodiment the hollow shell of the rotor hub is assembled from two hub parts of similar size. During assembly of the rotor hub the annular member is clamped between the two hub parts and are attached to the connecting portions of each hub part. The annular member extends circumferentially around a centre of the rotor hub, so that, when the wind turbine is assembled, the bearing attached to the annular member substantially is located around the centre of mass of rotating parts of the wind turbine. In an alternative embodiment, the shell of the rotor hub is assembled from six hub parts, wherein each hub part comprises the connecting portion adapted to be connected to the annular member.

In yet another embodiment of the invention the rotor hub comprises two annular members, wherein each annular member is integral with the bearing adapted to rotatably mount the rotor hub of the main shaft. In particular, each annular member may provide the outer ring of the bearing. The bearing may be configured as a journal bearing, roller bearing or ball bearing. Alternatively, each annular member is connectable to one of the bearings adapted to mount the rotor hub to the main shaft.

BRIEF DESCRIPTION OF THE DRAWINGS

In the following, the invention is described in detail with reference to the figures, wherein.

Like reference symbols refer to like parts in all figures.

DETAILED DESCRIPTION OF INVENTION

Figure 1:
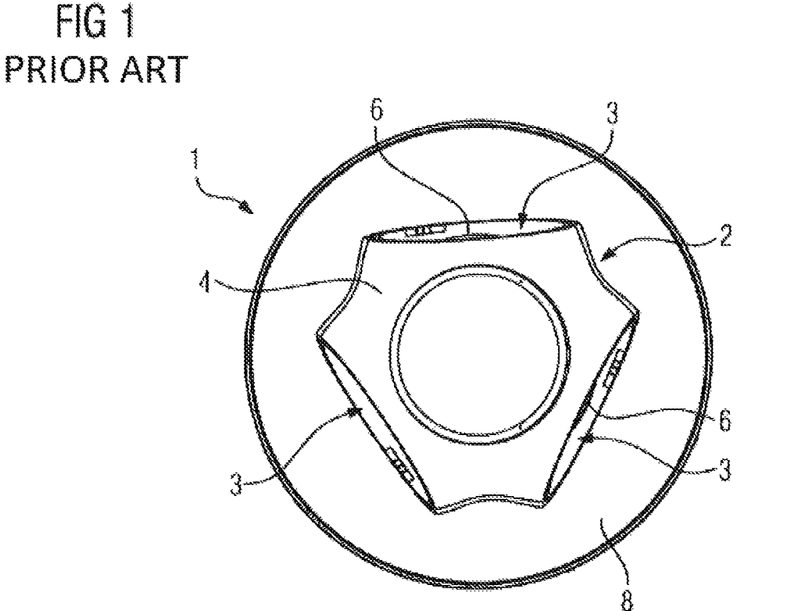
FIG. 1 shows a front view of components of a wind turbine according to prior art.

FIG. 1 shows a front view of components of a conventional wind turbine 1. Components illustrated in FIG. 1 include a rotor hub 2 having a plurality of openings 3. The rotor hub 2 comprises a hollow shell 4 defining an inner space or interior 5 of the rotor hub 2. Blade bearing flanges 6 circumferentially extend over a section of each opening 3. The blade bearing flanges 6 provide mounting means for attaching rotor blades to the rotor hub 2.

The rotor hub 2 is firmly connected to a rotor 7 of a generator of the wind turbine 1. The rotor 7 comprises a plurality of permanent magnets and is firmly connected to the rotor hub 2 by an annular support structure 8.

During operation of the wind turbine 1 the rotor 7 jointly rotates with the rotor hub 2 inducing a current in windings arranged on a stator 9 of the generator.

Figure 2:
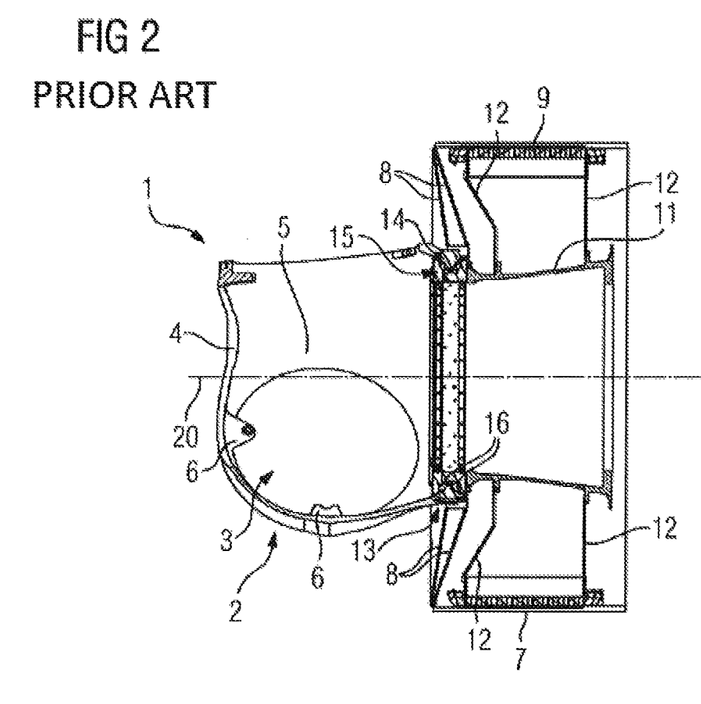
FIG. 2 shows a sectional view of the components of the wind turbine according to prior art.

FIG. 2 shows a sectional view of the wind turbine 1 according to prior art. The sectional plane shown in FIG. 2 include an axis of rotation and that is substantially defined by a central axis of a tubular main shaft 11 stationary arranged within a nacelle of the wind turbine 1. The stator 9 is firmly attached to the main shaft 11 by an auxiliary support structure 12. A single bearing 13 rotatably mounts the rotor hub 2 to the main shaft 11.

In the example shown in FIG. 2, the bearing 13 is configured as a double tapered roller bearing. The bearing 13 comprises an outer ring 14 and an inner ring 15. Roller 16 are arranged between the tapered wall of the inner ring 15 and the outer ring 14.

The centre of mass of rotating parts including the rotor hub 2 and components of the wind turbine 1 firmly connected to the rotor hub 2 such as the rotor blades and the rotor 7 is located somewhere within the interior 5 of the rotor hub 2. Thus, the bearing 13 is located far away from the centre of mass of the rotating parts. As a consequence, large bending moments are exerted on the bearing 13 that may arise from the static load caused by the weight of the rotating parts and/or from dynamic effects during use of the wind turbine 1.

Figure 3:
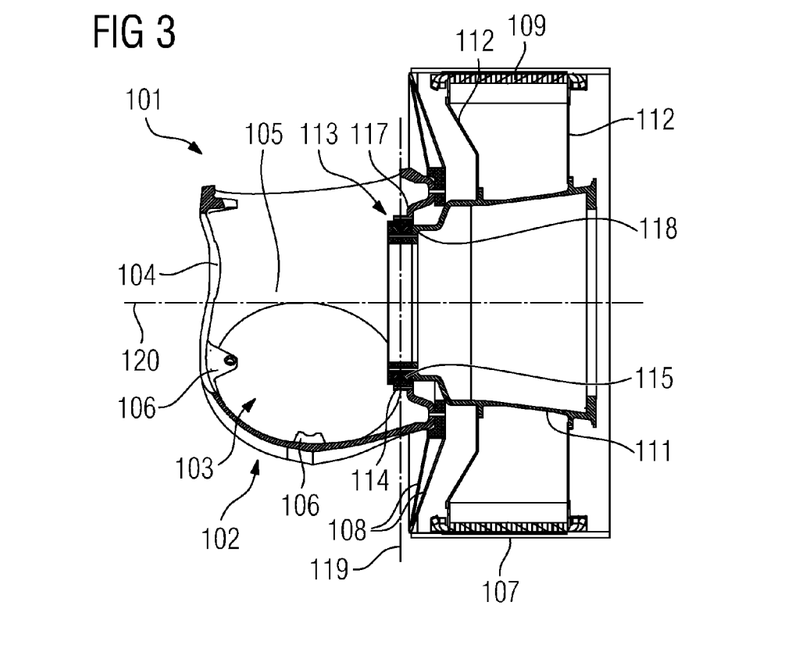
FIG. 3 shows a sectional view of components of a wind turbine according to first embodiment of the invention including a rotor hub rotatably mounted to a main shaft.

FIG. 3 shows a sectional view of components of a wind turbine 101 according to first embodiment of the invention. The wind turbine 101 comprises the rotor hub 102 that is rotatably mounted to a main shaft 111 stationary arranged within the nacelle of the wind turbine 101. During operation, the rotor hub 102 rotates around the axis of rotation 120 that substantially extends parallel to the main shaft 111.

Similar to the wind turbine 1 shown in FIGS. 1 and 2, the rotor 7 is firmly connected to the rotor hub 102 by the support structure 108. Accordingly, the stator 9 is firmly attached to the main shaft 111 by the auxiliary support structure 112. The configuration of the rotor hub 102 according to the first embodiment of the invention is similar to the rotor hub 2 shown in FIGS. 1 and 2. In particular, the rotor hub 102 comprises blade bearing flanges 106 arranged around the openings 103 adapted to be firmly connected to rotor blades. The rotor hub 102 has a hollow shell 104 defining an interior 105 of the rotor hub 102. The main difference of the rotor hub 102 according to the first embodiment of the invention and the conventional rotor hub 2 according to prior art is an annular member 117 that protrudes inwards into the interior 105 of the rotor hub 102 from the face of the rotor hub 102 facing the main shaft 111.

The annular member 117 of the first embodiment is configured as an annular flange integral with the rotor hub 102 that protrudes into the interior 105 in a radial and axial direction.

The annular member 117 is connected to an outer ring 114 of a bearing 113. The bearing 113 rotatably mounts the rotor hub 102 to the main shaft 111. An inner ring 115 of the bearing 113 is firmly connected to a section 118 of the main shaft 111 protruding into the interior 105 of the rotor hub 102. The bearing 113 is arranged as a double tapered thrust bearing. Rollers (not illustrated) are arranged between the tapered walls of the inner and outer rings 115, 114. The annular structure of the bearing 113 defines a vertical plane 119 extending perpendicular to the axis of rotation 120.

An elongated end section 118 of the main shaft 111 together with the annular member 117 protruding into the interior 105 of the rotor hub 102 allows for an arrangement of the bearing 113 closer to the centre of mass of the rotating parts of the wind turbine 101. In particular, the vertical plane 119 defined by the bearing 113 is located closer to the centre of mass of the rotating parts so that bending forces exerted on the bearing 113 are reduced.

Figure 4:
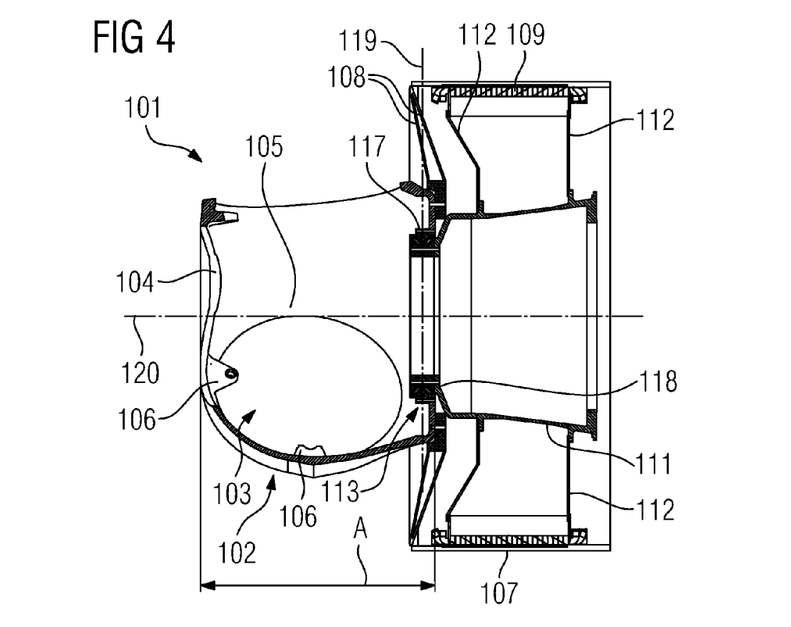
FIG. 4 shows a sectional view of a rotor hub rotatably mounted to a main shaft according to a second embodiment of the invention.

FIG. 4 shows components of a wind turbine 101 according to a second embodiment of the invention. The wind turbine 101 of the second embodiment is constructed and operates in a similar manner as described herein before with reference to FIG. 3.

The bearing 113 is located within the interior 105 of the rotor hub 102. Thus, in comparison to the conventional wind turbine 1, the vertical plane 119 defined by the bearing 113 is displaced in an axial direction so as to be located closer to the centre of mass of the rotating parts of the wind turbine 101.

For better comparison, the dimension A of the rotor hub 102 parallel to the axis of rotation 120 is indicated in FIG. 4. the vertical plane 119 defined by the bearing 113 is located within the interior 105 so that the bending moment imposed on the bearing 113 that is caused by the weight of the rotating parts is minimised. Thus, the lifetime of the bearing 113 is increased.

Figure 5:
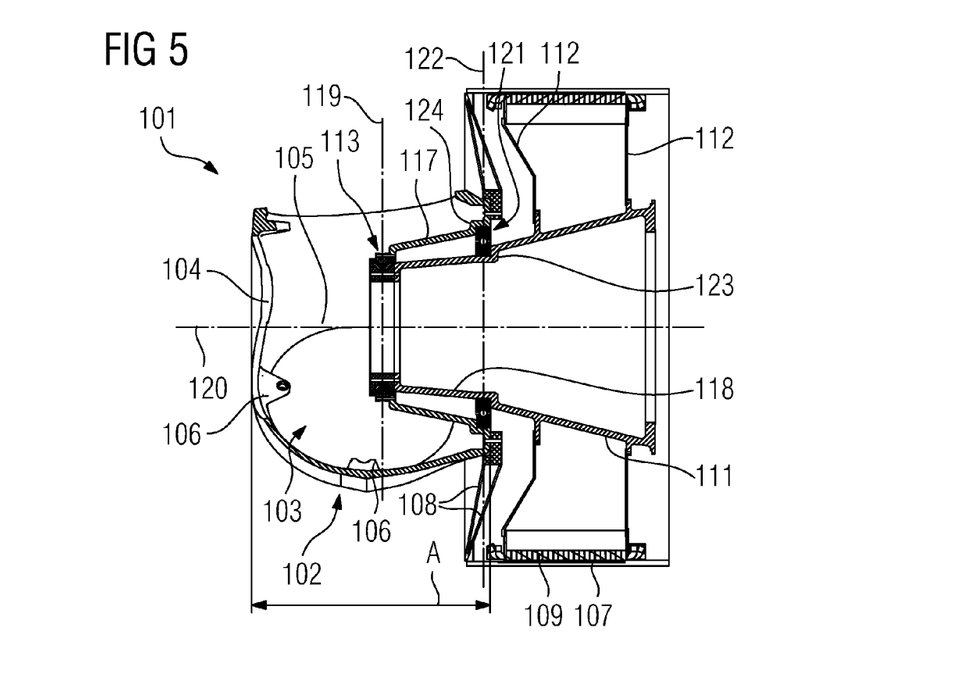
FIG. 5 shows a sectional view of a rotor hub mounted to a main shaft according to a third embodiment of the invention.

FIG. 5 shows a sectional view of a third embodiment of the components of the wind turbine 101. The wind turbine 101 of the third embodiment features a displacement of the vertical plane 119 defined by the bearing 113 in an axial direction so as to be located close to the centre of mass of the rotating parts. The wind turbine 101 exhibits the essential features of the first and second embodiment of the invention described herein before with reference to FIGS. 3 and 4. The end section 118 of the main shaft 111 has an elongate shape and protrudes into the interior 105 of the rotor hub 102 by an axial distance that almost equals to half of the dimension A of the rotor hub 102. Consequently, the bearing 113 connected to the section 118 is arranged close to the centre of the interior 105 defined by the hollow shell 104.

Accordingly, the annular member 117 has corresponding dimensions and protrudes into the interior 105 by a distance that corresponds to approximately half the axial dimension A of the rotor hub 2. The annular member 117 of the third embodiment is configured as a flange protruding from the face of the rotor hub 102 facing the nacelle side of the wind turbine 101.

In the third embodiment shown in FIG. 5, the rotor hub 102 is rotably mounted to the main shaft 111 via two bearings 113, 121. The bearing 113 is arranged as a double tapered roller bearing.

Alternatively the bearing 113 may be arranged as a journal bearing, sliding bearing or ball bearing.

The second bearing 121 is located within the interior 105 close to the end of the rotor hub 102 facing the main shaft 111. For comparison, another vertical plane 122 defined by the second bearing 121 is shown in FIG. 5.

The second bearing 121 is, in the exemplary embodiment shown, configured as a pure radial bearing. In particular, the second bearing 121 is configured as a ball bearing capable of supporting radial loads. The bearing 121 is located between shoulders 123, 124 that support the bearing 121 in both the axial and the radial direction. A first shoulder 123 is arranged on the main shaft 111 and a second shoulder 124 supporting the bearing 121 is located on the annular member 117.

Figure 6:
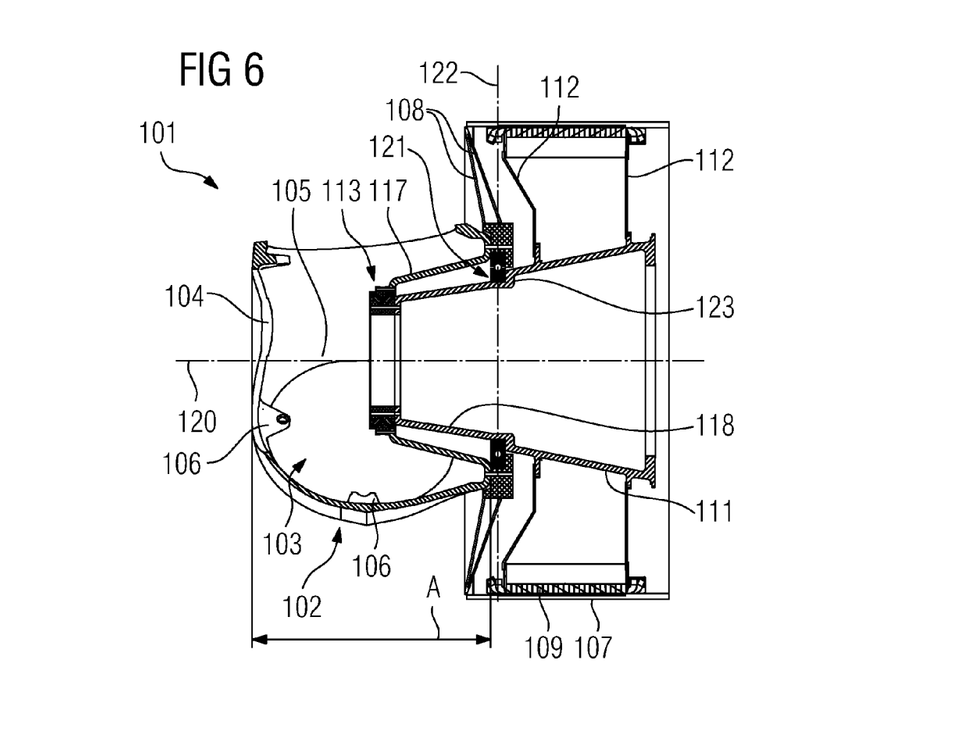
FIG. 6 shows a sectional view of a rotor hub mounted to a main shaft according to a fourth embodiment of the invention.

FIG. 6 shows a wind turbine 101 according to a fourth embodiment of the invention. The type of construction of the wind turbine 101 according to the fourth embodiment resembles the third embodiment depicted in FIG. 5. In particular, the rotor hub 102 is rotatably mounted to the main shaft 111 via two bearings 113, 121. The first bearing 113 is arranged as a double tapered roller or ball bearing. The second bearing 121 is configured as a pure radial ball bearing. The second bearing 121 is supported from the inside by the first shoulder 123 arranged on the main shaft 111. However, as opposed to the third embodiment shown in FIG. 5, the second bearing 121 is arranged outside of the rotor hub 102. The second bearing 121 abuts on the hollow shell 104 defining the interior 105 in a radial direction. For better comparison, the vertical plane 122 defined by the second bearing 121 and the dimension A of the rotor hub 102 along the axis of rotation 120 are indicated in FIG. 6.

Figure 7:
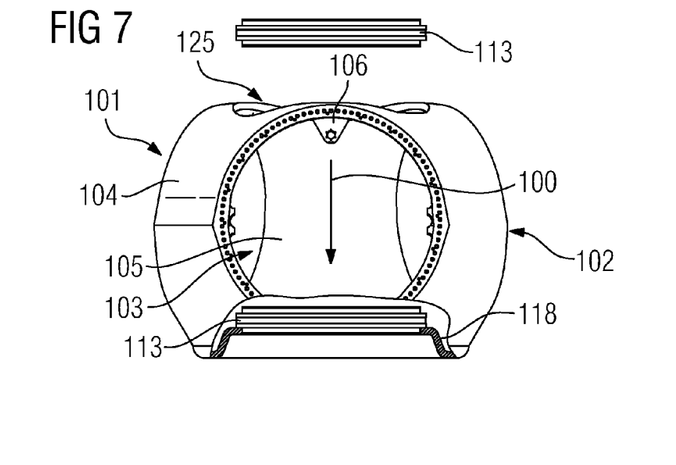
FIG. 7 illustrates a method for assembling a bearing that rotatably mounts the rotor hub of the first, second or third embodiment of the invention to the main shaft.

FIG. 7 schematically illustrates a method for assembling the wind turbine 101 according to one of the embodiments depicted in FIGS. 3 to 6. As the bearing 113 is no longer attached to the generator, it is necessary to firmly to position the generator within the nacelle of the wind turbine 101 before mounting the rotor hub 102.

According to one embodiment of the invention, temporary mounting is achieved by a flange arranged on the main shaft 111 and a temporary bolt connection. The bolt connection is removed after the rotor hub 102 is mounted.

In an alternative embodiment, a set of large pointed bolts are used to temporarily affix the rotor 107 to the stator 109. The bolts may be connected from the outside of the rotor 107 or from the inside of the stator 109. After installation of the rotor hub 102, the bolts are removed so as to allow for a rotation between the rotor 109 and the stator 107.

As indicated in FIG. 7, the main bearing 113 is introduced into the interior 105 of the rotor hub 102 via a central opening 125. The bearing 113 is moved in a direction indicated by an arrow 100. The central opening 125 has a relatively large diameter so that the bearing 113 may be introduced therein. The opening 125 is reinforced after the bearing 113 has been installed.

According to one embodiment, the central opening 115 is reinforced with a sandwich construction made from standard steel. Alternatively, the central opening 125 may be reinforced with a construction made from carbon fibre or aluminium. In further development of the invention, it is suggested to use a combination of the afore-mentioned constructions to reinforce the rotor hub 102 for increased stability.

After the bearing 113 has been connected to both the rotor hub 102 and the main shaft 111, the temporary connecting means are removed.

Figure 8:
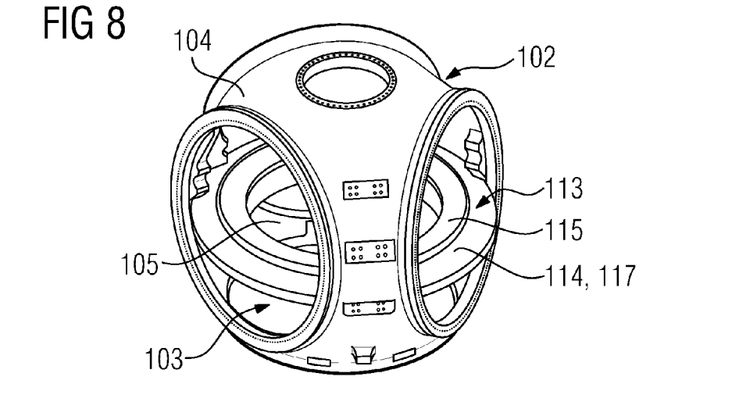
FIG. 8 shows a perspective view of a rotor hub according to a fifth embodiment of the invention.

FIG. 8 shows a fifth embodiment of the invention. The rotor hub 102 of the fifth embodiment comprises an annular member 117 integral with the hollow shell 104 defining the interior 105 of the rotor hub 102. The annular member 117 is arranged as an annular flange that protrudes into the interior 105 in the radial direction. The annular member 117 is arranged around a centre of the rotor hub 102 so that the bearing 113 that rotatably mounts the rotor hub 102 to the main shaft 111 of the wind turbine 101 is located close to the centre of mass of rotating parts when the wind turbine 101 is assembled.

Figure 9:
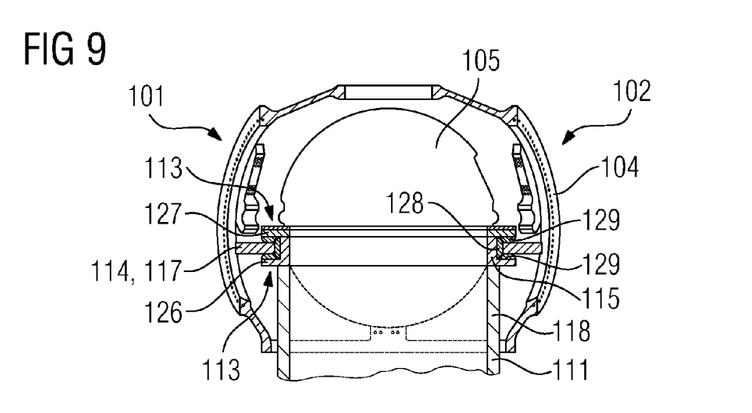
FIG. 9 shows a sectional view of the rotor hub according to a fifth embodiment of the invention.

FIG. 9 shows the rotor hub 102 according to the fifth embodiment of the invention in a sectional view. The bearing 113 is arranged as a journal bearing capable of supporting radial and axial loads, i. e. is configured as a thrust bearing. The annular member 117 provides an outer ring 114 of the bearing 113 that is slidably arranged with respect to the inner ring 115. To account for easy assembling, the inner ring 115 is made from a first ring component 126 comprising an L-shaped cross section and a second ring component 127 that is attached to the first ring component 126. When the first and the second ring components 126, 127 are attached to each other, the inner ring 115 comprises the U-shaped cross section as depicted in FIG. 9.

Several sliding pads 128, 129 are arranged between the inner ring 114 and the outer ring 115. The pads 128, 129 are circumferentially arranged around the inner ring 115 so as to minimise friction between the inner and the outer ring 115, 114. Two axial pads 129 configured as rings are attached to opposite sides of the U-shaped structure of the inner ring 115. Additionally, a ring shaped radial pad 128 is attached to the inner ring 115 that abuts on the outer ring 114 in a radial direction.

It is understood that the pads 128, 129 do not necessarily have to be designed as rings but may also be arranged as segments of a ring. Furthermore, the pads 128, 129 may comprise grooves, pockets or the like for deposition of lubrication, in particular lubricant oil.

In an alternative embodiment of the invention, the journal bearing 113 comprises an outer ring 114 with an elliptical cross section that retains the inner ring 115 that has a circular cross section. Lubricant oil may be disposed between the inner and the outer ring 115, 114 in a section of increased clearance. Journal bearings of this type are well known so that further explanations are omitted here.

Figure 10:
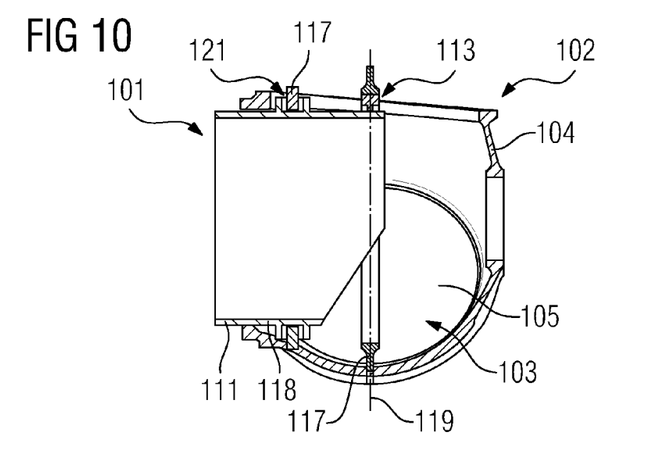
FIG. 10 shows a sectional view of a rotor hub according to a sixth embodiment of the invention having two bearings positioned inside the rotor hub.
Figure 11:
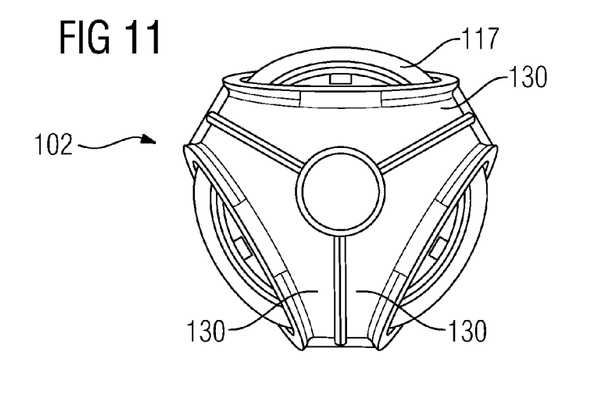
FIG. 11 shows a front view of the rotor hub according to the sixth embodiment.
Figure 12:
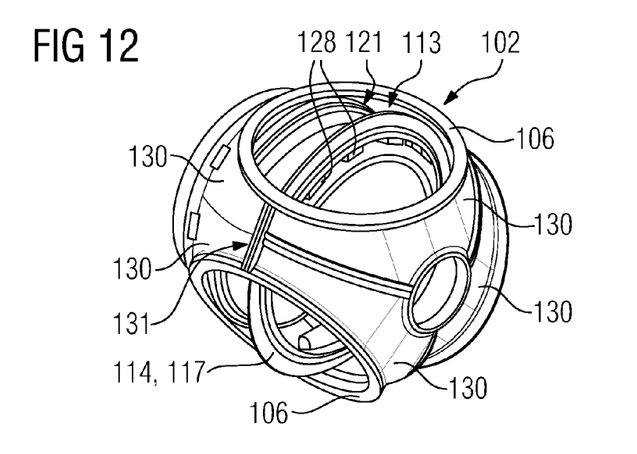
FIG. 12 shows an isometric view of the rotor hub according to the sixth embodiment.

FIGS. 10 to 12 show a rotor hub 102 according to a sixth embodiment of the invention. The rotor hub 102 is rotatably mounted to the main shaft 111 via two bearing 113, 121 located within the interior 105 of the rotor hub 102. The arrangement is similar to the third and forth embodiment of the invention depicted in FIGS. 5 and 6. However, the bearings 113 and 121 are arranged as sliding/journal bearings. The first bearing 113 is arranged as a radial bearing supporting radial loads. The second bearing 121 is arranged as a pure thrust bearing capable of supporting axial loads. The vertical plane 119 defined by the bearing 113 is located close to a centre of the rotor hub 102 so that the bearing 113 is positioned adjacent to the centre of mass of rotating parts when the wind turbine 101 is assembled.

As may be best seen in FIG. 11, the rotor hub 102 of the sixth embodiment is assembled from plurality of casted hub parts 130. Manufacturing the rotor hub 102 from several hub parts 130 that form, when attached to each other, the hollow shell 104 of the rotor hub 102, is beneficially as it allows for construction of bigger rotor hubs 102. Usually the process of casting limits the size of the components. The annular member 117 of the sixth embodiment is arranged as a separate piece that is attached to the hub parts 130 when the rotor hub 102 is assembled. The annular member 117 provides the outer ring 114 of the bearing 113 arranged as a radial journal bearing.

As maybe best seen in FIG. 12, the annular member 117 is attached via connecting portions 131 arranged on the hub parts 130 when the rotor hub 102 is assembled. Each hub part 130 comprises a section of the blade bearing flange 106. A plurality radial pads 128 are arranged on the inner ring 115 of the bearing 113. The radial pads 128 of the sixth embodiment are not arranged around the full circumference of the inner ring 115 as illustrated in FIG. 13.

Figure 13:
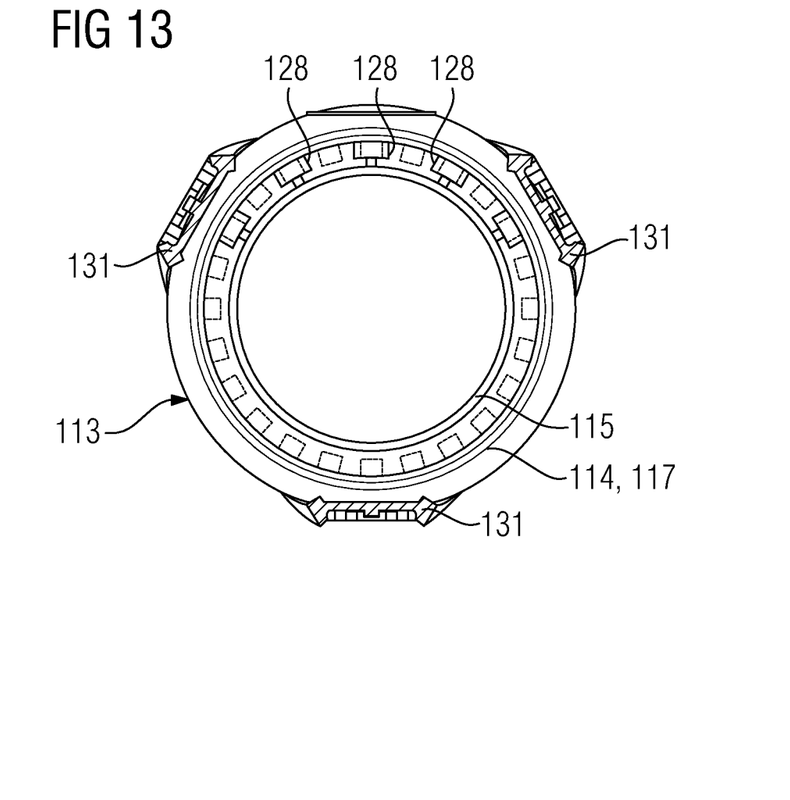
FIG. 13 shows a sectional view of a first bearing connected to the rotor hub according to the sixth embodiment.

FIG. 13 shows a sectional view of the bearing 113 of the sixth embodiment of the invention depicted in FIGS. 10 to 12. A plurality of radial pads 128 are arranged around an upper circumference of the inner ring 115. The radial pads 128 are arranged so as to pivot about a small angle when the wind turbine 101 is in use. Arrangement of the tilting radial pads 128 around an upper circumference of the inner ring 115 allows for a support in regions with large load. At the same time, friction is minimised as only a minimal number of tilting pads 128 that abut against the outer ring 114 is used.

Figure 14:
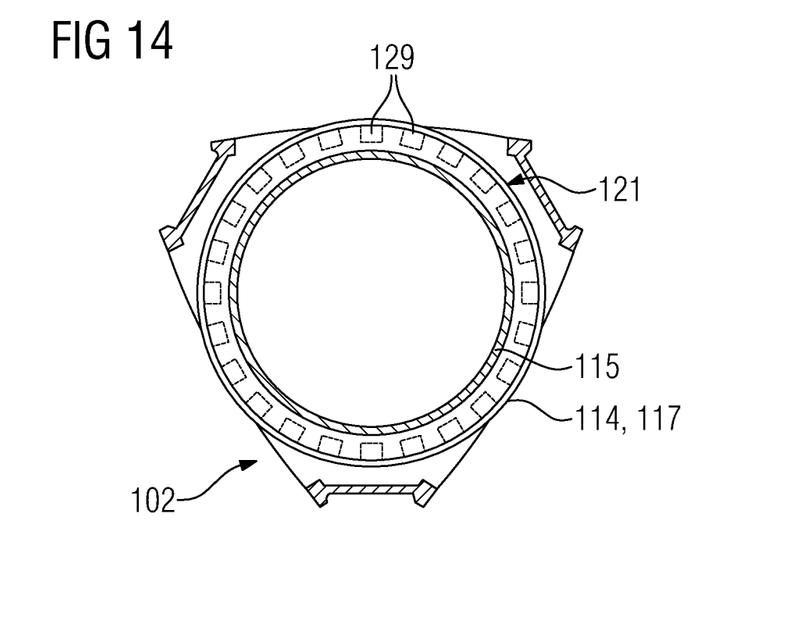
FIG. 14 shows a sectional view of a second bearing connected to the rotor hub according to the sixth embodiment of the invention.

FIG. 14 shows a sectional view of the second bearing 121 of the sixth embodiment of the invention depicted in FIGS. 10 to 12. The second bearing 121 of the sixth embodiment is arranged as a pure thrust bearing capable of supporting axial loads. Accordingly, a plurality of axial pads 129 are arranged around the full circumference of the outer ring 114. The axial pads 129 abut against the inner ring in the axial direction parallel to the axis of rotation 120. Grooves and pockets between the axial pads 129 are used for containing lubricants, in particular grease or oil.

Figure 15:
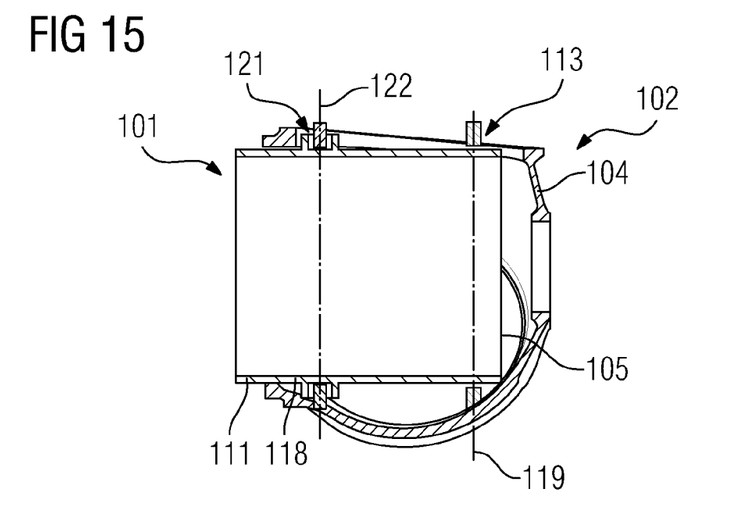
FIG. 15 shows a sectional view of a rotor hub according to a seventh embodiment of the invention.

FIG. 15 shows a seventh embodiment of a wind turbine 101 according to the invention. The exemplary embodiment shown in FIG. 15 is similar to the sixth embodiment already described herein before and illustrated in particular in FIGS. 10 to 12. The radial first bearing 113 defining the vertical plane 119 is located close to a front end of the rotor hub 102.

The second bearing 121 designed as a thrust bearing is located close to the end of the rotor hub 102 facing the nacelle side of the wind turbine 101. Both bearings 118, 121 are located within the interior 105 defined by the shell 104 of the rotor hub 102. The bearings 121, 113 are arranged in a manner, so that, when the wind turbine 101 is assembled, the centre of mass of the rotating parts lies between the vertical plane 122 defined by the second bearing 121 and the vertical plane 119 defined by the first bearing 113.

Figure 16:
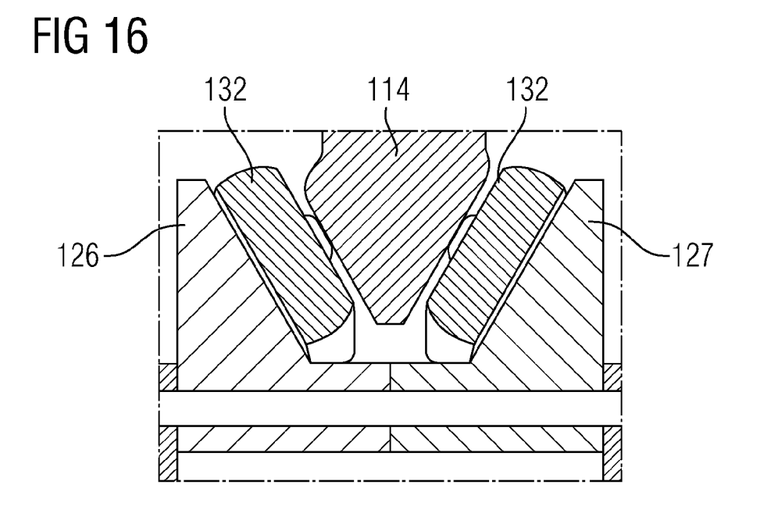
FIG. 16 shows a detailed view of a thrust bearing capable of supporting axial and radial loads.

FIG. 16 shows a detailed view of a journal bearing arranged as a thrust bearing that may be used in combination with any of the embodiments described herein before. The inner ring 115 is made from the first and second ring component 126, 127. Each ring component 126, 127 comprises a tilted section that mounts a plurality of tilted thrust pads 132. The thrust pads 132 abut on the outer ring 114 that has a double-tapered or arrow-shaped cross-section. Thus, the bearing 113 depicted in FIG. 16 is arranged as a thrust bearing that is capable of supporting loads in the radial and in the axial direction.

Although the present invention has been described in detail with reference to the preferred embodiment, the present invention is not limited by the disclosed examples from which the skilled person is able to derive other variations without departing from the scope of the invention.

We claim:

1. A rotor hub for a wind turbine, comprising:
a hollow shell defining an interior; and
an annular member integral part of or connectable to a bearing,
wherein the rotor hub is adapted to be connected to a plurality of rotor blades,
wherein the bearing is adapted to rotatably mount the rotor hub to a stationary main shaft of the wind turbine,
wherein the annular member protrudes inwards into the interior of the rotor hub; and wherein the annular member extends axially inwards into the interior from a side of the hollow shell configured to face, when the wind turbine is assembled, the stationary main shaft of the wind turbine.

2. The rotor hub of claim 1, wherein the annular member extends radially inwards from an inner surface of the hollow shell.

3. The rotor hub according to claim 1, wherein the annular member is an annular flange integral with the hollow shell.

4. The rotor hub according to claim 1,
wherein the hollow shell is assembled from at least two hub parts, and
wherein each hub part comprises at least a section of a blade bearing flange adapted to be connected to one of the rotor blades and at least a connecting portion adapted to be connected to the annular member.

5. A rotor hub for a wind turbine, comprising:
a hollow shell defining an interior; and
an annular member integral part of or connectable to a bearing,
wherein the rotor hub is adapted to be connected to a plurality of rotor blades,
wherein the bearing is adapted to rotatably mount the rotor hub to a stationary main shaft of the wind turbine,
wherein the annular member protrudes inwards into the interior of the rotor hub; and wherein the rotor hub comprises two annular members, each annular member being integral with or connectable to a bearing adapted to rotatably mount the rotor hub to the stationary main shaft.

6. The rotor hub according to claim 5, wherein the annular member is an annular flange integral with the hollow shell.

7. The rotor hub according to claim 5,
wherein the hollow shell is assembled from at least two hub parts, and
wherein each hub part comprises at least a section of a blade bearing flange adapted to be connected to one of the rotor blades and at least a connecting portion adapted to be connected to the annular member.

8. A wind turbine, comprising:
a stationary main shaft arranged within a nacelle of the wind turbine;
a rotor hub comprising a hollow shell defining an interior; and
a plurality of rotor blades extending radially outwards from the rotor hub,
wherein the rotor hub is rotatably mounted to the stationary main shaft via a bearing, and
wherein the bearing is arranged within the interior of the rotor hub and connected to a section of the stationary main shaft protruding into the interior of the rotor hub;
wherein the rotor hub is rotatably mounted to the stationary main shaft via at least two bearings;
wherein at least one of the two bearings is located in the interior of the rotor hub;
wherein one of the at least two bearings is configured to support at least an axial load; and the other of the at least two bearings is configured to support at least a radial load.

9. The wind turbine as claimed in claim 8,
wherein an outer ring of the bearing is firmly connected to or integral with the annular member of the rotor hub protruding inwards into the interior of the rotor hub, and
wherein the outer ring is rotatably arranged relative to an inner ring of the bearing that is firmly connected to the section of the stationary main shaft protruding into the interior of the rotor hub.

10. The wind turbine as claimed in claim 8, wherein the bearing is configured as a radial bearing or a thrust bearing.

11. The wind turbine as claimed in claim 8, wherein a rotor of a generator is attached to the rotor hub and a stator of the generator is attached to the stationary main shaft.

12. The wind turbine as claimed in claim 11, wherein the bearing is selected from the group consisting of a ball bearing, roller bearing, tapered roller bearing, sliding bearing, journal bearing, hydrodynamic bearing, hydrostatic bearing and hybrid bearing.

13. The wind turbine according to claim 8,
wherein the bearing defines a vertical plane perpendicular to an axis of rotation,
wherein a centre of mass of rotating parts is located in the vertical plane, and
wherein the rotating parts include the rotor hub and parts of the wind turbine that are firmly attached to the rotor hub.

14. The wind turbine according to claim 8,
wherein the at least two bearings are located in the interior of the rotor hub, each bearing defining a vertical plane perpendicular to an axis of rotation,
wherein the at least two bearings are arranged so that the centre of mass of the rotating parts is located between the vertical planes defined by the bearings, and
wherein the rotating parts include the rotor hub and parts of the wind turbine that are firmly attached to the rotor hub.

* * * * *